UNITED STATES PATENT OFFICE.

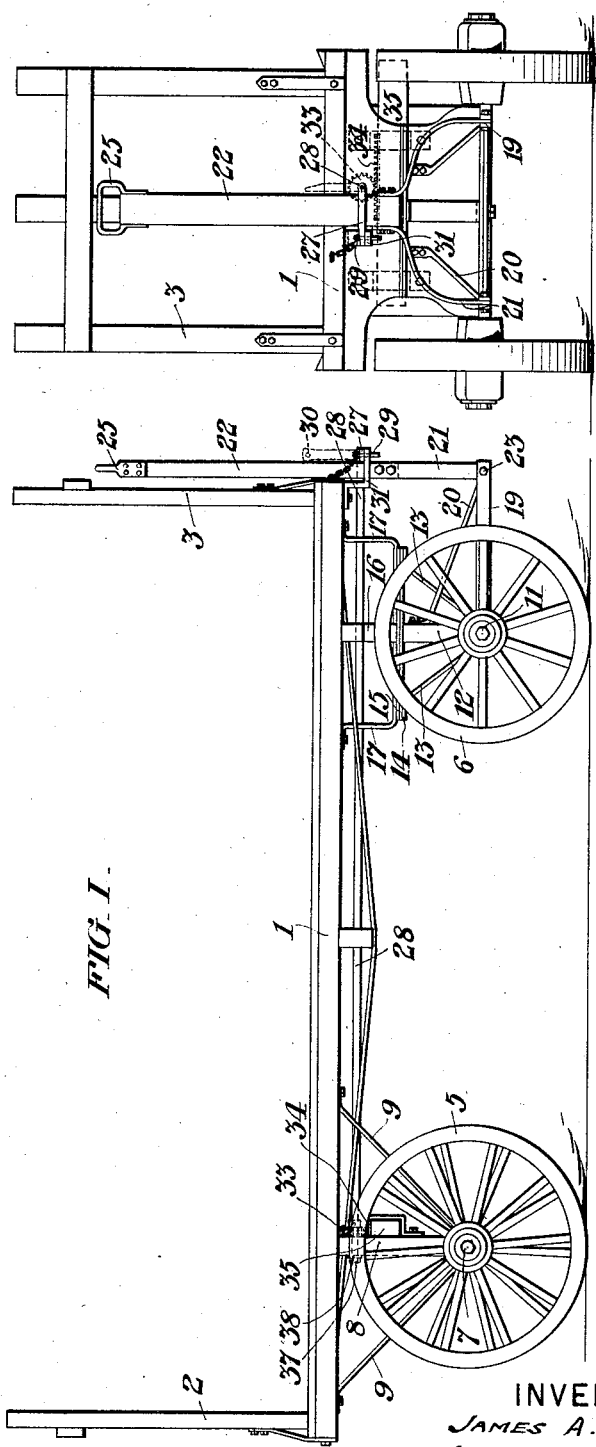

JAMES A. MURPHEY, OF GERMANTOWN, PENNSYLVANIA.

RAILROAD-STATION TRUCK.

1,077,738. Specification of Letters Patent. Patented Nov. 4, 1913.

Application filed May 17, 1910. Serial No. 561,886.

*To all whom it may concern:*

Be it known that I, JAMES A. MURPHEY, of Germantown, in the county of Philadelphia and State of Pennsylvania, have invented a certain new and useful Improvement in Railroad-Station Trucks, whereof the following is a specification, reference being had to the accompanying drawing.

My invention relates to vehicles especially adapted for transporting baggage to and from the cars at railroad stations and comprising a platform body mounted on two pairs of supporting wheels; the front pair being dirigible by means of a handle or tongue which is pivotally connected with the front axle so that it may be upturned at the front of the truck when it is not in use. Such trucks being intermittently but frequently used are allowed to stand when idle adjoining the railroad tracks, and, as they are not ordinarily provided with any means to prevent their displacement, they sometimes gravitate, are blown, or otherwise reach the tracks, impede traffic and occasion damages in collisions with trains. Moreover, such trucks having no braking means are difficult to control on down grades when loaded and then require two or more men to handle them.

It is the object of my invention to provide such a truck with means to prevent its accidental displacement from any position in which it is set by the operator and to enable a single operator to control it on a down grade. As hereinafter described, such means includes a shaft extending longitudinally beneath the truck body, having a lever arm at the front thereof adapted to extend transversely in front of the tongue to retain the latter when it is upturned in idle position, and having at its rear end a gear wheel engaging a rack on a slide bar which is mounted to reciprocate transversely beneath said body so that it may be extended between the spokes of one of the rear supporting wheels to prevent the rotation thereof when said shaft is turned to present its arm in position to retain the tongue; said bar being released from the wheel and withdrawn beneath the truck body when said shaft is turned by said arm to release the tongue.

My invention includes the various novel features of construction and arrangement hereinafter more definitely specified.

In the drawing; Figure I is a side elevation of a truck conveniently embodying my improvement. Fig. II is a front end view of said truck.

In said figures; the platform body 1 of the truck, provided with the vertical standards 2 and 3 respectively at the rear and front thereof, is supported by two pairs of wheels, respectively 5 and 6. Said wheels 5 are mounted to rotate freely upon the stationary rear axle 7 which is secured to said body 1 by the body bolster 8 and braces 9, and, said wheels 6 are mounted to rotate freely upon the dirigible axle 11 having the axle bolster 12 connected by the braces 13 with the fifth wheel 14 arranged to turn on the fifth wheel 15 which is rigidly connected to said body 1, by the body bolster 16 and braces 17. Said front axle 11 and its bolster 12 are provided with the braces 19 and 20 to which the yoke 21 of the tongue 22 is pivotally connected by the bolt 23. Said tongue has the handle 25 by which said front axle and wheels may be conveniently manipulated, said tongue being turned down when it is desired to use it to steer or draw the truck. However, when said tongue is not in use it may be upturned to the position shown in the drawing, in which position it is held by the arm 27 on the shaft 28 which extends transversely in front of said tongue 22 to retain the latter in the position shown. Accidental displacement of said arm 27 is prevented by the removable pin 29 which extends through the eye 30 in the end of said arm 27 and engages the bracket 31 which is rigidly connected with the truck body 1. Said arm 27 is an operating lever handle on said shaft 28 which is journaled in said bolsters 8 and 16 and carries the gear wheel 33 adjoining said bolster 8 and engaging the rack 34 on the slide bar 35 which is arranged to slide transversely on said bolster 8 so that when said lever arm 27 is turned horizontally as shown in Fig. II said bar is projected between the spokes of one of the wheels 5 as shown in said figure so as to prevent movement of the truck in either direction. Said shaft 28 is prevented from longitudinal displacement by the nut 37 engaging the rear end thereof and having the washer 38 bearing upon said bolster 8 in opposition to the gear wheel 33 which as aforesaid is secured on said shaft. Therefore, it is to be understood that with the parts in the position shown in the drawing the truck cannot be moved forward or back because the rear wheel 5 is engaged by said slide bar 35, and, the truck cannot be turned laterally because the tongue 22 engaged by the lever arm 27 between the shaft 28 and the bracket 31 holds the front axle 11 parallel with the rear axle 7. However, by removing the pin 29 and upturning the arm 27 to the position shown in dotted lines in Fig. II said slide bar 35 is withdrawn from engagement with the wheel 5 and the tongue 22 is freed to be turned down into position to operate the truck.

It may be observed that the locking devices above described are not only advantageous in preventing accidental movement of the truck when it is idle but may be employed to check and control its movement when in use, so that one man can handle a loaded truck on a down grade which would otherwise require two men to control it. For this purpose the lever arm 27, shaft 28 and slide bar 35 may be shifted into the locked position shown in Fig. II while the tongue 22 is turned down in operative position, whereupon, although the truck is free to be turned laterally, its movement in the direction of its length is retarded by the one wheel 5 which is locked by the bar 35 and thus prevented from rotating, but which may slide on a down grade and thus serve as a brake upon the truck.

I do not desire to limit myself to the precise details of construction and arrangement herein set forth as it is obvious that various modifications may be made therein without departing from the essential features of my invention as defined in the appended claims.

I claim:—

1. In a railroad station truck, the combination with a body having front and rear bolsters and two pairs of supporting wheels, one pair being dirigible; of a pivoted tongue operatively connected with said dirigible wheels and arranged to be upturned at the end of the truck; a shaft journaled in said bolsters and projecting at the front end of said truck upon one side of said tongue; a bracket projecting at the front end of said truck upon the opposite side of said tongue; a lever handle rigidly secured on the front end of said shaft arranged to turn in front of said tongue and retain the latter in upturned position between said shaft and bracket, whereby said dirigible wheels are maintained parallel with the other wheels; a pin arranged to detachably connect said lever handle with said bracket; a slide bar arranged to reciprocate transversely with respect to the truck and engage one of the rear wheels thereof; a gear rack carried by said slide bar; a gear wheel fastened on said shaft in engagement with said rack; and means including a nut engaging the end of said shaft projecting through said rear bolster and preventing longitudinal displacement of said shaft.

2. In a vehicle, the combination with a body having front and rear pairs of supporting wheels, one pair being dirigible; of a pivoted tongue operatively connected with said dirigible wheels and arranged to be upturned at the front end of the vehicle; a shaft projecting at the front end of said vehicle upon one side of said tongue; a lever handle on the front end of said shaft arranged to turn in front of said tongue and retain the latter in upturned position; a slide bar arranged to reciprocate transversely with respect to the vehicle and engage one of the rear wheels thereof; and, means operatively connecting said shaft and said slide bar.

3. In a railroad station truck; the combination with a body having front and rear pairs of supporting wheels, the front pair being dirigible; of a pivoted tongue connected with said dirigible wheels and arranged to be upturned at the front end of the truck; a slide bar arranged to reciprocate parallel with the axis of the rear wheels to and from engagement between the spokes of one of said wheels; a rotary shaft extending longitudinally beneath the truck body, transversely with respect to said slide bar and having means connecting it with said slide bar, whereby the latter may be positively shifted to and from its operative position; and, means at the front end of said shaft arranged to hold said tongue in upturned position and thereby retain said dirigible front wheels parallel with said rear wheels.

4. In a railroad station truck; the combination with a body having front and rear pairs of supporting wheels, the front pair being dirigible; of a pivoted tongue connected with said dirigible wheels and arranged to be upturned at the front end of the truck; a slide bar arranged to reciprocate parallel with the axis of the rear wheels to and from engagement between the spokes of one of said wheels; a rotary shaft extending longitudinally beneath the truck body, transversely with respect to said slide bar and having means connecting it with said slide bar, whereby the latter may be positively shifted to and from its operative position; and, means, independent of said tongue, arranged to hold the latter in upturned position and thereby retain said dirigible front wheels parallel with said rear wheels.

In testimony whereof, I have hereunto signed my name at Philadelphia, Pennsylvania, this twelfth day of May, 1910.

JAMES A. MURPHEY.

Witnesses:
 NAN C. HILL,
 GEORGE E. WOMBLEY.

Copies of this patent may be obtained for five cents each, by addressing the "Commissioner of Patents, Washington, D. C."